Sept. 22, 1953

J. J. ZIMMERMANN

COMBINATION TIMING AND TELEPHONE CIRCUIT CONTROLLING SYSTEM

Filed June 4, 1951

2,653,195

INVENTOR.
Joseph J. Zimmermann
BY Andrus & Sceales
ATTORNEYS.

Patented Sept. 22, 1953 2,653,195

UNITED STATES PATENT OFFICE 2,653,195

COMBINATION TIMING AND TELEPHONE CIRCUIT CONTROLLING SYSTEM

Joseph J. Zimmermann, Milwaukee, Wis., assignor to The Electronic Secretary, Inc., Milwaukee, Wis., a corporation of Wisconsin Application June 4, 1951, Serial No. 229,779

13 Claims. (Cl. 179—178)

This invention relates to timing and actuating systems, and particularly to a mechanism for lifting the handset of a telephone and for insuring that the handset is subsequently lowered either normally or in the event of abnormal occurrences and breakdown.

An object of the invention is to provide a mechanism utilizing but a single motor both to lift a telephone handset off the base unit therefor, thereby closing the talking circuit of the telephone, and to effectively time and control the period during which said handset remains in its elevated condition.

Another object is to provide an improved means for effecting lowering of a telephone handset in the event of a failure of current supply to the handset elevating mechanism, thereby preventing interference with the telephone system through continued maintenance of the telephone talking circuit in a closed condition.

A further object of the invention is to provide a relatively simple and inexpensive safety timing system adapted to de-energize a timed object and maintain said object in a de-energized condition until repair of defects in the normal timing means for the object.

The invention, in general, comprises a motor adapted to drive an actuating means until a switch is engaged to render inoperative the motor and any load being timed, with the switch being of the manual reset variety to prevent recycling of the system in spite of separation of the switch and actuating means by a return means. In addition, the actuating means is adapted to lift a telephone handset to close a telephone talking circuit and the return means, such as a spring, is constantly operative to cause opening of the talking circuit upon failure of the current supply to the motor. The handset lifter and timer are constructed as a unitary mechanism with but a single motor to effect handset lifting and normal or safety handset lowering functions.

Other objects and advtantages of the invention will be set forth more fully in the following description of the embodiment of the invention illustrated in the accompanying drawings.

The invention is particularly designed to be employed in a device for automatically answering a telephone during the absence of the called subscriber and for recording any message dictated by the maker of the incoming call. Such a device is shown and described in my copending application Serial No. 117,759, filed September 26, 1949.

Figure 1:
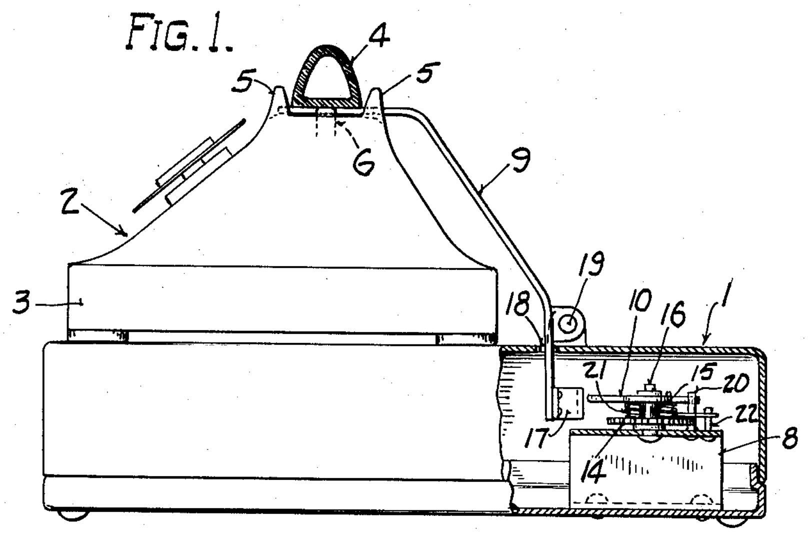
Figure 1 is a side elevation showing the apparatus as employed in lifting the handset of a telephone, with portions being broken away and sectioned as along line 1—1 of Fig. 2.

Referring to Fig. 1 of the drawings, the telephone answering device may include a desk cabinet 1 adapted to support a telephone set 2 having a base unit 3 and handset 4. As is customary in desk-type telephones, the handset 4 is kept in position by ears 5 on the base unit and normally serves to maintain the upwardly biased telephone switch buttons 6 in a depressed condition, so that the telephone talking circuit remains open until the handset is lifted by either manual or automatic means.

In order to lift the handset 4 automatically and in a relatively slow and jerkless manner, a suitable rotary type electric motor 7 is supported on a mounting plate 8 within the desk cabinet 1. The mounting plate is preferably bolted to the floor of the cabinet and is arranged in such a manner that the motor is underneath the plate, whereas the mechanism driven thereby is above the plate for ready accessibility when the cabinet is disassembled.

The means operatively connecting the motor 7 and the switch depressing handset 4 include a link means or lever 9, a drive or actuating arm 10, and a speed reducing gear train partially contained within a gear housing 11 disposed adjacent the motor. The remainder of the gear train consists of a small spur gear 12 (Figs. 2 and 3) mounted on a shaft 13 which extends through the mounting plate 8 from the end gear within housing 11, and a large spur gear 14 meshed with gear 12 and rigidly affixed to a sleeve 15 on a stud shaft 16 which projects upwardly from plate 8. One end of the arm 10 is secured to the sleeve 15 and operation of the motor 7 acts through the described gear train and sleeve to cause pivot of the arm around stud shaft 16.

Figure 2:
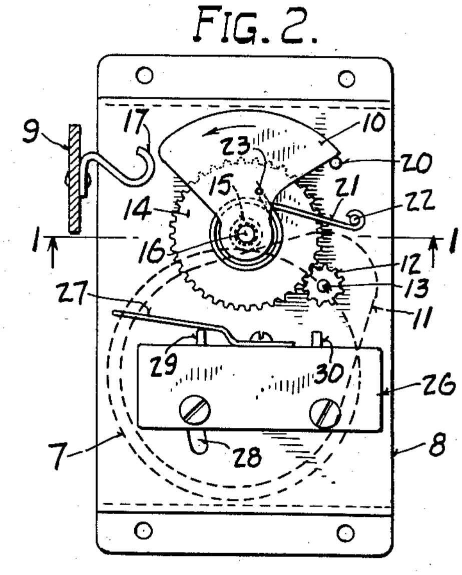
Fig. 2 is a detail top plan view of the timing and actuating mechanism illustrated in section in Fig. 1.
Figure 3:
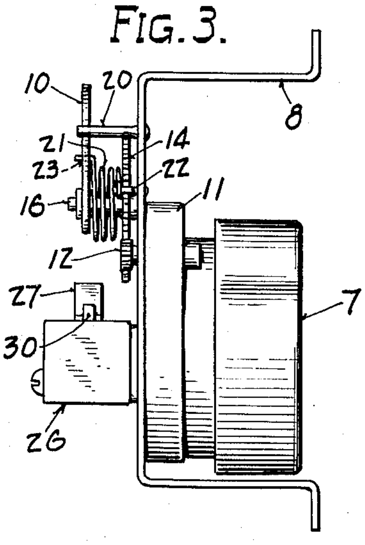
Fig. 3 is a side elevation of the showing of Fig. 2.

As shown in Fig. 2, the actuating arm 10 is shaped in the form of a fan-like cam segment, the outer edge of which is adapted to engage and move a suitably shaped cam follower clip 17 mounted at the lower portion of the link means or lever 9. From its cam follower portion, the lever 9 extends upwardly through an aperture 18 in the top of cabinet 1 and is bent horizontally for insertion beneath the handset 4 or other object to be lifted.

In operation, rotation of the cam segment arm 10 by motor 7 causes the cam follower clip 17 to ride up the outer edge of the cam segment 10 and pivot the lever 9 about a fulcrum pin 19 mounted on the upper surface of cabinet 1. The horizontal portion of the lever is thus elevated to lift the handset 4 a slight distance off the switch buttons 6, with the ears 5 still being operative to prevent the handset from sliding out of position.

The handset remains in its elevated condition, so that the telephone talking circuit is closed by switch buttons 6, until the arm 10 is returned to its initial position in engagement with a stop pin 20 projecting upwardly from the mounting plate 8. According to the invention, the means to return the arm to its initial position upon cessation of the driving action of motor 7 is a spring 21 which is coiled around stud shaft 16 and connected at its respective ends to a binding post 22 on the mounting plate and to an apertured portion 23 of the drive arm 10.

Figure 4:
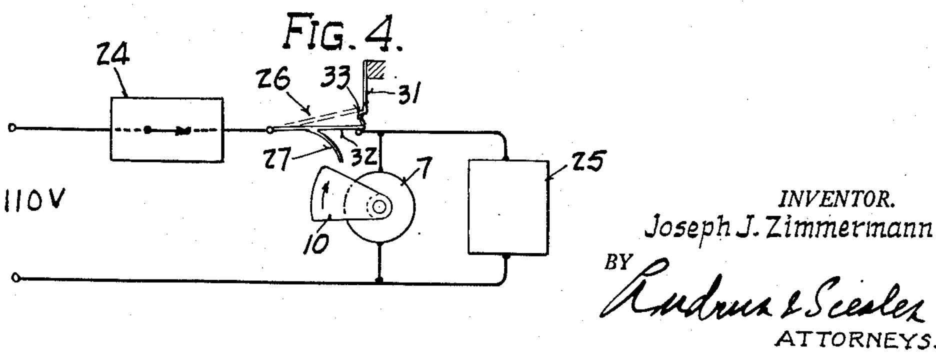
Fig. 4 is a schematic wiring diagram illustrating the safety timing system as employed in controlling a load to be timed.

Referring to Fig. 4, the motor 7 is energized by a suitable source of current through a circuit which may include a timing means 24 adapted to close and open the motor circuit at desired intervals. For example, in the copending application previously referred to, the timing means 24 constitutes a switch actuated by the movements of a phonograph mechanism, the latter being started in operation by the ringing of the telephone with which the telephone answering device is associated. In this arrangement, the load 25 to be timed, which may include the phonograph and wire recorder of the telephone answering device, is also controlled by the timing mechanism 24 as by being connected in parallel with motor 7.

In the operation of the present invention, as employed with the telephone answerer described in the referred to copending application, the ringing of the telephone bell causes operation of the phonograph mechanism and consequent closing of the switch of timing means 24 to energize the motor 7 and the load 25 to be timed. The cam segment arm 10 is thus caused to rotate slowly against the bias of spring 21 and after a predetermined period of time engages the cam follower 17 to effect lifting of the telephone handset 4.

During operation of the phonograph and recorder of the telephone answering device to transmit and record messages travelling over the now closed telephone talking circuit, the cam follower rides along the outer edge of the slowly moving cam segment arm 10. As soon as the transmitting and recording functions of the telephone answering device are completed, after a predetermined period of time, the phonograph mechanism is operated by movement of the phonograph tone arm to the center of the answering record and causes opening of the switch of the timing mechanism 24.

The load 25 to be timed, including the phonograph and wire recorder, is thus de-energized as is the motor 7, and the spring 21 becomes operative to return arm 10 to its initial position in engagement with stop pin 20. The cam follower portion of lever 9 being no longer engaged by arm 10, the telephone handset 4 falls to depress switch buttons 6 and open the telephone talking circuit.

It is essential, in order to prevent interference with the telephone system, that the telephone talking circuit be opened not only by the normal operation of the timing means 24 but in the event of any abnormal condition which may occur. One such abnormal condition, occurring when there is an accidental failure of the power supply to the motor 7 during the interval when handset 4 is in its elevated condition, is automatically provided for by the spring 21. This spring is operative to return arm 10 to its initial position and thus effect lowering of the handset 4 at any time that the motor becomes inoperative, either through operation of the timing means 24 or because of a power failure.

A second abnormal condition occurs when the timing mechanism 24 fails to function properly and does not open the power circuit to motor 7 at the proper time. For example, where a phonograph is used as the timing means and the opening of the power circuit to motor 7 is dependent upon the movement of the phonograph tone arm to the center of the answering record, a sticking of the tone arm will result in continued motor energization. In order to effect safety handset lowering when this occurs, a control switch 26 is mounted on plate 8 and provided with an operating arm 27 disposed in the path of member 10 for actuation thereby in the event of operation of the system over an unusually long period of time.

The control switch 26, which is of the normally closed variety, is connected in series with the switch of timing means 24 to control the energization of the motor 7 and the load 25 to be timed. Accordingly, engagement of the switch operating arm 27 by the member 10, which is now employed as a switch engaging means, causes opening of the switch 26 and consequent de-energization of the motor.

As shown in Fig. 2, a slot 28 is provided in the mounting plate 8 to permit adjustment of one of the mounting screws for switch 26 to a different location. The switch 26 may thus be pivoted to different locations for regulation of the time interval which expires before the switch is actuated. In the illustrated use of the invention, this time interval is longer than the normal period of operation of the telephone answering device and may be accurately determined when the motor 7 is of a constant speed variety.

Since the switch operating arm 27 is only engaged by the rotating arm 10 when there is a defect in the timing means 24, it is highly desirable that the system be rendered inoperative until the defect in the timing means is discovered and repaired. Also, it is necessary to prevent recycling of the system, causing intermittent opening and closing of the telephone talking circuit, which may occur because of the fact that the arm 10 and switch operating member 27 are separated by the spring 21 as soon as the motor 7 becomes de-energized.

According to the invention, these objects are attained by using a switch 26 which is of a manual reset variety and is preferably snap action. In Fig. 2 a switch is illustrated wherein a button 29 beneath operating arm 27 remains depressed, after the arm 27 is engaged, to hold the motor circuit open until a second button 30 is manually pressed by a repair man or operator.

A similar principle is schematically represented in Fig. 4, showing a vertical spring 31 adapted to hold a flexible contact member 32 in depressed condition until the member 32 is snapped upwardly upon continued engagement of operating arm 27 by the drive member 10. The member 32 is maintained in elevated position by a shoulder portion 33 of the spring 31 until it is pressed down by a repair man after servicing the timing means 24. The motor 7 and the load 25 to be timed are thus maintained in a de-energized condition until suitable repairs are made, thereby insuring against interference with the telephone system with which the device is employed.

The invention provides a simple and reliable means of performing handset lifting and normal or safety handset lowering functions. Because of the use of a single motor for both handset moving and safety operations, a great saving space is achieved as well as a very considerable saving in cost.

Various embodiments of the invention may be employed within the scope of the following claims.

I claim:

1. In a safety timing mechanism for a control circuit having a normal time period of operation, a normally closed switch in said circuit permitting operation thereof in repeat cycles of operation, switch engaging means, a motor responsive to current flow in said circuit and adapted to relatively move said switch and switch engaging means until the same engage each other for actuation of said switch, said motor-effected relative movement of said switch and switch engaging means being controlled by said switch and discontinued thereby upon engagement thereof in the event of operation of said motor and flow of current in said circuit beyond the normal time period of one cycle therefor, and means to separate said switch and switch engaging means upon discontinuance of said motor-effected relative movement, said switch being of a manual reset type to prevent recycling of the mechanism after said separation.

2. In a safety timing mechanism for recycling apparatus having a normal period of operation for each cycle, an electric motor connected in circuit with a source of current for said apparatus to operate only during cycling periods thereof, switch engaging means driven by said motor, a spring biasing said switch engaging means toward an initial position and operative to return said means to said initial position upon de-energization of said motor at the end of each cycle of operation, and a normally closed switch connected in said circuit and disposed in the path of said switch engaging means for opening thereby to de-energize said motor after a predetermined period of operation of the mechanism longer than the time period of a cycle of operation of the apparatus, said switch being of a manual reset type to prevent recycling of the mechanism after the return of said switch engaging means to said initial position upon de-energization of said motor by said switch.

3. In a safety timing system, a motor, switch engaging means adapted to be moved forwardly by said motor, timing means normally operative to discontinue the forward motion of said switch engaging means after a predetermined period of time, a switch disposed in the path of said switch engaging means and adapted to be actuated thereby after a time interval longer than said predetermined period of time and when actuated to discontinue the forward motion of said switch engaging means, and means to return said switch engaging means to an initial position upon discontinuance of the forward motion thereof by either said timing means or said switch, said switch being of a manual reset type to prevent operation of the system until correction of the defect in said timing means which permitted said switch engaging means to actuate said switch.

4. In a safety timing system, a substantially constant speed electric motor connected in circuit with a source of current, an arm driven by said motor, a spring biasing said arm toward an initial position and operative to return said arm thereto upon de-energization of said motor, timing means normally operative to de-energize said motor after a predetermined period of time, and a normally closed manual-reset switch connected in said motor circuit and disposed in the path of said arm for opening thereby to de-energize said motor after a time interval longer than said predetermined period of time, said manual-reset switch operating to cause continued de-energization of said motor and to thus prevent recycling of the system until repair of the defect in said timing means which permitted said arm to actuate said switch.

5. In a device for lifting the switch depressing member of a telephone off the base unit thereof to thereby close the talking circuit of said telephone, a rotary type electric motor, means connecting said electric motor with said switch depressing member to cause lifting thereof, and means to return said connecting means to an initial inoperative position to open the talking circuit, said return means enabling said switch depressing means to drop and open the talking circuit of said telephone both during normal operation of the device and in the event of an accidental failure of the current supply to said device.

6. In a device for lifting the handset of a telephone off the base unit thereof to thereby close the talking circuit of said telephone, an electric motor, drive means connected to said motor and driven slowly thereby, link means having one portion arranged in the path of said drive means and another portion operatively associated with said handset to lift the same upon engagement of said one portion by said drive means, and a spring biasing said drive means toward an initial position and operative upon de-energization of said motor to return said drive means to said position, said spring return permitting said handset to drop and open the talking circuit of said telephone in the event of an accidental failure of the current supply to said motor.

7. In a device for lifting the handset of a telephone off the base unit thereof to thereby close the talking circuit of said telephone, a rotary type electric motor, a cam segment geared to said motor and driven thereby, a lever having one end inserted beneath said handset and the other end disposed adjacent said cam segment, said other end of said lever being provided with a cam follower portion adapted to be moved by said cam segment during operation of said motor to thereby effect lifting of said handset off said base unit, and a spring operative upon de-energization of said motor to return said cam segment to an initial position out of lifting engagement with said cam follower portion, said spring return permitting said handset and lever to move to their initial positions and open the talking circuit of said telephone in the event of an accidental failure to the current supply to said motor.

8. A combination timing and telephone circuit controlling apparatus, comprising a motor, connecting means operated by said motor to lift the handset of a telephone and thereby close the talking circuit thereof, first handset lowering means to disconnect said connecting means and effect lowering of said handset after a normal period of operation of the apparatus, and safety handset lowering means adapted to be operated by said connecting means after a time interval longer than said normal period of operation to disconnect said connecting means and effect lowering of said handset, said safety handset lowering means insuring opening of said telephone talking circuit in the event of a failure of operation of said first handset lowering means.

9. A combination timing and object moving apparatus, comprising a motor, rotary cam means driven by said motor and adapted to engage an object and move the same, control means operated by said cam means and adapted to discontinue the forward movement of said cam means caused by said motor, and means to return said cam means to an initial position upon discontinuance of said forward movement, said return means operating to disengage said cam means from said object and permit return of said object to an initial position.

10. A combination timing and telephone circuit controlling apparatus, comprising a rotary motor, actuating means driven by said motor and adapted to lift the handset of a telephone to close the talking circuit thereof, a switch disposed in the path of said actuating means and adapted when engaged thereby to discontinue the forward motion thereof caused by said motor, and a spring biasing said actuating means toward an initial position and operative upon discontinuance of said forward motion to return said actuating means to said initial position, said spring return operating through said actuating means to effect lowering of said handset and consequent opening of said telephone talking circuit after a period of time determined by the time taken by said actuating means to reach said switch.

11. A combination timing and telephone circuit controlling apparatus, comprising a rotary type electric motor connected in a circuit with a source of current, an actuating member driven by said motor, means operated by said member after a predetermined period of time to close the talking circuit of a telephone, a normally closed switch connected in said motor circuit and disposed in the path of said actuating member for opening thereby to de-energize said motor after a period of time longer than said predetermined period of time, and a spring biasing said actuating member toward an initial position and operative to return said member to said initial position and thus effect opening of said telephone talking circuit upon de-energization of said motor, said switch being of a manual reset type to prevent recycling of the apparatus after the return of said member to said initial position.

12. A combination safety timing and telephone circuit controlling system, comprising an electric motor, an arm driven forwardly by said motor, link means having one portion adapted to be moved by said arm and another portion operatively associated with a telephone switch to effect closing of the talking circuit of a telephone upon movement of said one portion by said arm, means adapted after a normal period of operation of the system to effect discontinuance of the forward motion of said arm, a manual-reset switch disposed to be actuated by said arm after a period of time longer than said normal period of operation and adapted when actuated to effect discontinuance of the forward motion of said arm, and a spring operative upon discontinuance of said forward motion to return said arm to an initial position, said spring return operating through said link means to effect opening of said telephone talking circuit in the event of an accidental failure of the current supply to said motor.

13. A combination safety timing and telephone circuit controlling system, comprising a rotary type electric motor connected in a circuit with a source of current, a cam segment geared to the motor and driven forwardly thereby, a lever having one end inserted beneath the handset of a telephone and the other end disposed adjacent the cam segment, said other end of the lever being provided with a cam follower portion adapted to be moved by the cam segment during operation of the motor to effect lifting of said handset and closing of the talking circuit of said telephone, a spring biasing the cam segment toward an initial position and operative to return the same thereto upon deenergization of said motor, timing means normally operative to de-energize said motor after a predetermined period of time, and a normally closed manual-reset switch connected in said motor circuit and disposed in the path of the cam segment for opening thereby to de-energize the motor after a time interval longer than said predetermined period of time, said manual-reset switch operating to effect continued de-energization of the motor and thus prevent recycling of the system and interference with the telephone talking circuit until repair of the defect in said timing means which permitted the cam segment to reach the manual-reset switch.

JOSEPH J. ZIMMERMANN.

References Cited in the file of this patent

UNITED STATES PATENTS

| Number | Name | Date |
|---|---|---|
| 2,036,420 | Lowry et al. | Apr. 7, 1936 |
| 2,053,143 | Frederick | Sept. 1, 1936 |
| 2,143,692 | Haar | Jan. 10, 1939 |
| 2,163,419 | Warren | June 20, 1939 |
| 2,188,055 | Marsh et al. | Jan. 23, 1940 |
| 2,223,207 | Ellis | Nov. 26, 1940 |
| 2,230,191 | Knight | Jan. 28, 1941 |
| 2,388,686 | Habig | Nov. 13, 1945 |
| 2,533,234 | Edwards | Dec. 12, 1950 |